US 8,745,001 B1

(12) United States Patent
Goldschmidt (10) Patent No.: US 8,745,001 B1
(45) Date of Patent: Jun. 3, 2014

(54) AUTOMATED REMEDIATION OF CORRUPTED AND TEMPERED FILES

(75) Inventor: Cassio B. Goldschmidt, West Los Angeles, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1033 days.

(21) Appl. No.: 12/059,200

(22) Filed: Mar. 31, 2008

(51) Int. Cl.
*G06F 7/00* (2006.01)
*G06F 17/00* (2006.01)

(52) U.S. Cl.
USPC .......................................... 707/638; 707/645

(58) Field of Classification Search
None
See application file for complete search history.

(56) References Cited

U.S. PATENT DOCUMENTS

| 6,611,850 | B1 * | 8/2003 | Shen | 1/1 |
| 2004/0260968 | A1 * | 12/2004 | Edwards et al. | 714/4 |
| 2005/0060356 | A1 * | 3/2005 | Saika | 707/204 |
| 2006/0235907 | A1 * | 10/2006 | Kathuria et al. | 707/204 |
| 2007/0235907 | A1 * | 10/2007 | Christel | 264/537 |

* cited by examiner

*Primary Examiner* — Sherief Badawi
*Assistant Examiner* — Berhanu Mitiku
(74) *Attorney, Agent, or Firm* — Campbell Stephenson LLP (57) ABSTRACT

A method, apparatus and computer-readable storage medium for ascertaining a set of preliminary characteristics of a first data structure and, responsive to determining that the set of preliminary characteristics matches a set of characteristics of a reference data structure, determining that a secondary characteristic of the first data structure indicates a replacement of the first data structure with the reference data structure is disclosed. Embodiments of the present invention further include replacing the first data structure with the reference data structure, in response to determining that the secondary characteristic of the first data structure indicates the replacement of the first data structure.

17 Claims, 8 Drawing Sheets

AUTOMATED REMEDIATION OF CORRUPTED AND TEMPERED FILES

BACKGROUND OF THE INVENTION

1. Field of the Invention

This invention relates to data storage systems and, more particularly, to performing backups and restores of data in data storage systems.

2. Description of the Related Art

Backup systems are used to protect data against loss. Typically, a backup system includes software that periodically copies user data to a backup storage device (e.g., such as a tape drive). If data is lost (e.g., due to user error or device failure), the backed-up copy of the data is retrieved from the backup storage device.

Many organizations implement a network-based backup system in order to ensure that the organization's data is regularly backed up. By way of non-limiting example, a company can implement a network-based backup system to ensure that employees' data is backed up on a daily basis. Data that is stored on storage devices connected to the network is then backed up at regular intervals.

Unfortunately, inadequate options exist for detection and remediation of individual files suffering from the impact of tampering or corruption. Modern backup systems are focused on the recovery of disasters that inflict loss of entire volumes of files. When a large amount of data is lost or destroyed (e.g., by the loss of a physical hard drive or destruction of a server resulting from lightning strike), the loss of data is easily identified by the end user. Loss of individual files (e.g., through viral corruption or user tampering) is far more difficult for the user to detect and remedy. Viruses are frequently designed to disguise damage and operate covertly until massive damage to a system has been accomplished. A user tampering with a file may be similarly motivated to reduce visible evidence of tampering. In either case, no thorough and automated system for detecting and remedying damage to individual files exists.

SUMMARY OF THE INVENTION

A method, apparatus and computer-readable storage medium for ascertaining a set of preliminary characteristics of a first data structure and, responsive to determining that the set of preliminary characteristics matches a set of characteristics of a reference data structure, determining that a secondary characteristic of the first data structure indicates a replacement of the first data structure with the reference data structure is disclosed. Embodiments of the present invention further include replacing the first data structure with the reference data structure, in response to determining that the secondary characteristic of the first data structure indicates the replacement of the first data structure.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

The present invention provides a method, system and computer program product for detection and remediation of corrupted or tampered files. In the context of a backup system, the present invention allows the backup system to compare a newly received backup copy of a file to backup copies of the same file (i.e., copies of a file having the same identifying characteristics) that are present on other systems that are backed up by the backup system. If characteristics of the newly received copy indicate that tampering or corruption has occurred, the present invention allows for a backup system to replace the defective file, either from a previous backup copy or from a deployment master.

Similarly, in a free-standing system for detection and remediation of corrupted or tampered files, the present invention allows for a detection and remediation system to compare a copy of a file on a subject system to copies of the same file that are present on peer systems that are subject to examination by the detection and remediation system. If characteristics of the newly received copy indicate that tampering or corruption has occurred, the present invention allows for a backup system to replace the defective file from a deployment master or from copies present on peer systems. A diagnostic engine provides analysis of the cause of a tampering or corruption incident.

Figure 1:
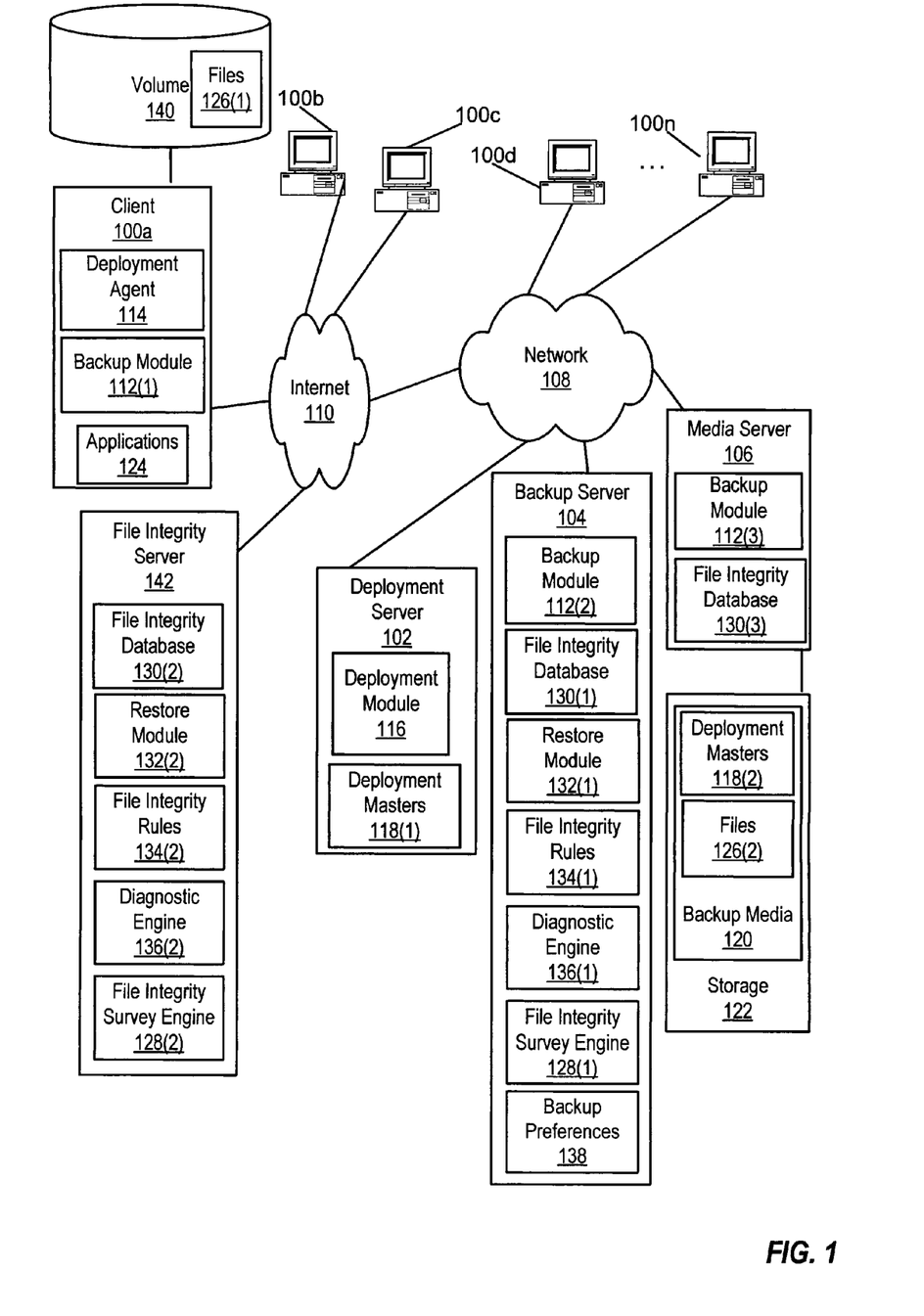
FIG. 1 illustrates a block diagram of a system for performing automated remediation operations on corrupted or tampered files, according to one embodiment of the present invention.

FIG. 1 illustrates, a block diagram of a system for performing automated remediation operations on corrupted or tampered files, in accord with one embodiment of the present invention. The components in FIG. 1 can perform deployment of software, backups, restores from backups, restores from deployment masters, and selective restores of individual files from backups. FIG. 1 includes clients 100a-100n, a deployment server 102, a backup server 104, and a media server 106. Note that, where the numerical notation "n" is used in the present application, it is provided to indicate a plurality of objects, without necessarily specifying a consistent quantity between different instances of notation "n" or a correspondence between members of different pluralities labeled "n", though such correspondence or consistent quantity may exist in some embodiments of the present invention.

Deployment server 102, backup server 104, and media server 106 are coupled by a network 108. Client 100a can also connect directly to network 108. However, in this example, client 100a is instead coupled to network 108 by Internet 110. In one embodiment, client 100a can communicate with deployment server 102, backup server 104 and media server 106 (e.g., using a variety of techniques ranging from FTP and HTTP to email and instant messaging), even though client 100a does not have direct access to network 108.

Network 108 can include one or more WANs (Wide Area Networks), LANs (Local Area Networks), and/or one or more SANs (Storage Area Networks). Network 108 can be implemented using various media, including coaxial cables, fiber optic cables, and wireless links. In general, a preferred embodiment of network 108 presents a secure network that allows various computing devices to communicate with each other as well as with the backup system that includes backup server 104. Network 108 may implement various security techniques, such as firewall techniques.

As shown, client 100a, backup server 104, and media server 106 each include backup and restore client software or agents implemented by backup modules 112(1), 112(2), and 112(3). Such agents as backup modules 112(1) and 112(2) typically receive instructions from backup server 104 and handle the extraction of data from and placement of data to clients 100a-100n. Together, the backup and restore agents can backup and restore information stored on the client system. In one embodiment, backup modules 112(1)-112(3) are implemented using VERITAS NetBackup™ or VERITAS BackupExec™ software, available from Symantec Corporation of Cupertino, Calif.

In one embodiment, software is deployed to clients 100a-100n using deployment agents, such as deployment agent 114 on client 100a. Deployment agent 114 receives software from deployment server 102, which uses deployment module 116 to send data retrieved from deployment masters 118(1), which can also be stored on backup media 120 of storage 122 as deployment masters 118(2).

Client 100a is coupled to (or, alternatively, includes) a storage device, volume 140. Volume 140 is a physical or logical storage device that stores one or more files 126(1). Volume 140 can include one or more physical storage devices (e.g., in one embodiment, volume 140 is implemented on a storage array that includes several independent hard drives). Applications 124 executing on client 100a can access (e.g., read and write) files 126(1) stored on volume 140. In other embodiments, the information stored on volume 140 can organized using a variety of data objects (e.g., database records, object-based storage, and the like).

Backup server 104 further includes a file integrity survey engine 128. File integrity survey engine 128 stores in a file integrity database 130(1) details for any files 126(1) on volume 140. File integrity survey engine 128 uses file integrity rules data structure 134 to identify files 126(1) that appear to have become corrupted. A file integrity database 130(3) may, alternatively, reside on media server 106. File integrity database 130(1) stores information, as detailed in FIG. 2, received for each of a selected set of files 126(1). File integrity database 130(1-2) can also store information received from backup modules 112(1-3).

In one embodiment, backup server 104 further includes a restore module 132 for restoring files 126(1) that appear to have become corrupted. Restoration of files 126(1) can also be accomplished using deployment server 102. In one embodiment, a diagnostic engine 136(1) enables backup server 104 to identify causes that have resulted in files 126(1) becoming corrupted. In one embodiment, diagnostic engine 136(1) analyzes characteristics for each file in a file integrity database that is considered present in less than four percent of clients 100a-100n, called an "outlier", and compares those characteristics to characteristics of files that are considered to be the "mode" (i.e., most frequently occurring value on a set) on the backup. Where recurring cases of the same failure occur, diagnostic engine 136(1) may note a pattern typical of a known virus.

Backup server 104 includes backup module 112(2), which initiates backups of client data. By way of non-limiting example, backup module 112(2) can include a user interface that allows an administrator to specify when client data (such as files 126(1), which are maintained by client 100a) should be backed up. Backup module 112(2) can also control media server 106 and interact with client 100a. In one embodiment, backup module 112(2) stores information received from a user interface in backup preferences 138.

Media server 106 implements backup module 112(3), which participates in backup system operations (such as backups and restores) under direction from backup server 112(2). In this example, backup module 112(3) creates a backup by copying information the information stored on volume 140 to backup media 120 (backup media 120 is part of a pool of storage 122, which can include various types of storage devices, that is accessible to media server 104). As shown, a point-in-time copy (files 126(2)) of files 126(1) is stored on backup media 120. Backup media 120 can include sequential storage media such as magnetic tape as well as random access media such as hard disk drives, optical disks (e.g., CDs (Compact Discs) and DVDs (Digital Versatile Discs), and the like).

When client 100a is not directly connected to network 108, backup module 112(1) is configured to send data (e.g., such as all or part of files 126(1)) that is to be backed up to media server 106 using techniques a variety of techniques ranging from FTP and HTTP to email and instant messaging. In particular, backup module 112(1) is configured to collect the necessary data and metadata, which describes the data, package the data and metadata, and send the data and metadata to backup module 112(3).

Backup module 112(1) can send messages that contain backup data in response to requests for backup (e.g., as received from a user or from backup server 104). Backup module 112(1) can also send such messages periodically, at prescheduled times, or in response to certain events.

In one embodiment, backup module 112(1) generates and sends the backup information without user assistance. The backup transaction is transparent to the user of client 100a, such that the user is unaware that the backup module is sending data to the backup server (or vice versa).

It is noted that, in some embodiments, client 100a will participate in traditional network-based backup techniques whenever client 100a is directly connected to network 102. In some such embodiments, backup module 112(1) can detect whether client 100a is directly connected to network 108 and select which type of backup techniques to use dependent upon whether a direct connection to network 108 is present. Similarly, if restores are being performed, backup module 112(3) can detect whether client 100a is currently present in the network 108.

Using embodiments of the present invention, when backup server 104 receives files 126(1) from client 100a, backup server 104 can compare characteristics, stored in file integrity database 130(1), of files 126(1) from client 100a to characteristics, stored in file integrity database 130(1), of files 126(2) previously received from clients 100b-100n. On the basis of a set of primary characteristics, such as a filename and creation date, backup server 104 can ascertain that multiple copies of a given file from among files 126(1) and files 126(2) represent the same file and should be identical. On the basis of a second characteristic, such as a hash of the content of files 126(1) and file 126(2), backup server 104 can then use file integrity rules data structure 134(1) to determine that a copy of a file from among files 126(1) has been subject to tampering or corruption. Backup server 104 can then replace files 126(1) that have been determined to be corrupted or tampered with in files 126(1) with copies from files 126(2) that are not subject to tampering or corruption. backup server 104 can order deployment server 102 to deploy fresh copies of files 126(1) to client 100a from deployment masters 118(1). Backup server 104, in some embodiments, employs diagnostic engine 136(1) to ascertain the cause of corruption of files 126(1).

In an alternative embodiment, a free-standing file integrity server 142 contains a file integrity database 130(2), a restore module 132(2), file integrity rules data structure 134(2), a diagnostic engine 136(2) and a file integrity survey engine 128(2). File integrity server 142 compares characteristics of files 126(1) from client 100a, stored in file integrity database 130(2), with characteristics of files 126(2) from clients 100b-n to characteristics, stored in file integrity database 130(1). On the basis of a set of primary characteristics, such as a filename and creation date, backup server 104 can ascertain that multiple copies of a given file from among files 126(1) and similar files previously surveyed from clients 100b-100n represent the same file and should be identical. On the basis of a second characteristic, such as a hash of the content of files 126(1) and similar files previously surveyed from clients 100b-100n, backup server 104 can then use file integrity rules data structure 134 to determine that a copy of a file from among files 126(1) has been subject to tampering or corruption. File integrity server 142 can then replace files 126(1) with copies requested from clients 100b-100n that are not subject to tampering or corruption, or file integrity server 142 can order deployment server 102 to deploy fresh copies of files 126(1) to client 100a from deployment masters 118(1). File integrity server 142 can employ diagnostic engine 136(2) to ascertain the cause of corruption of files 126(1).

Figure 2:
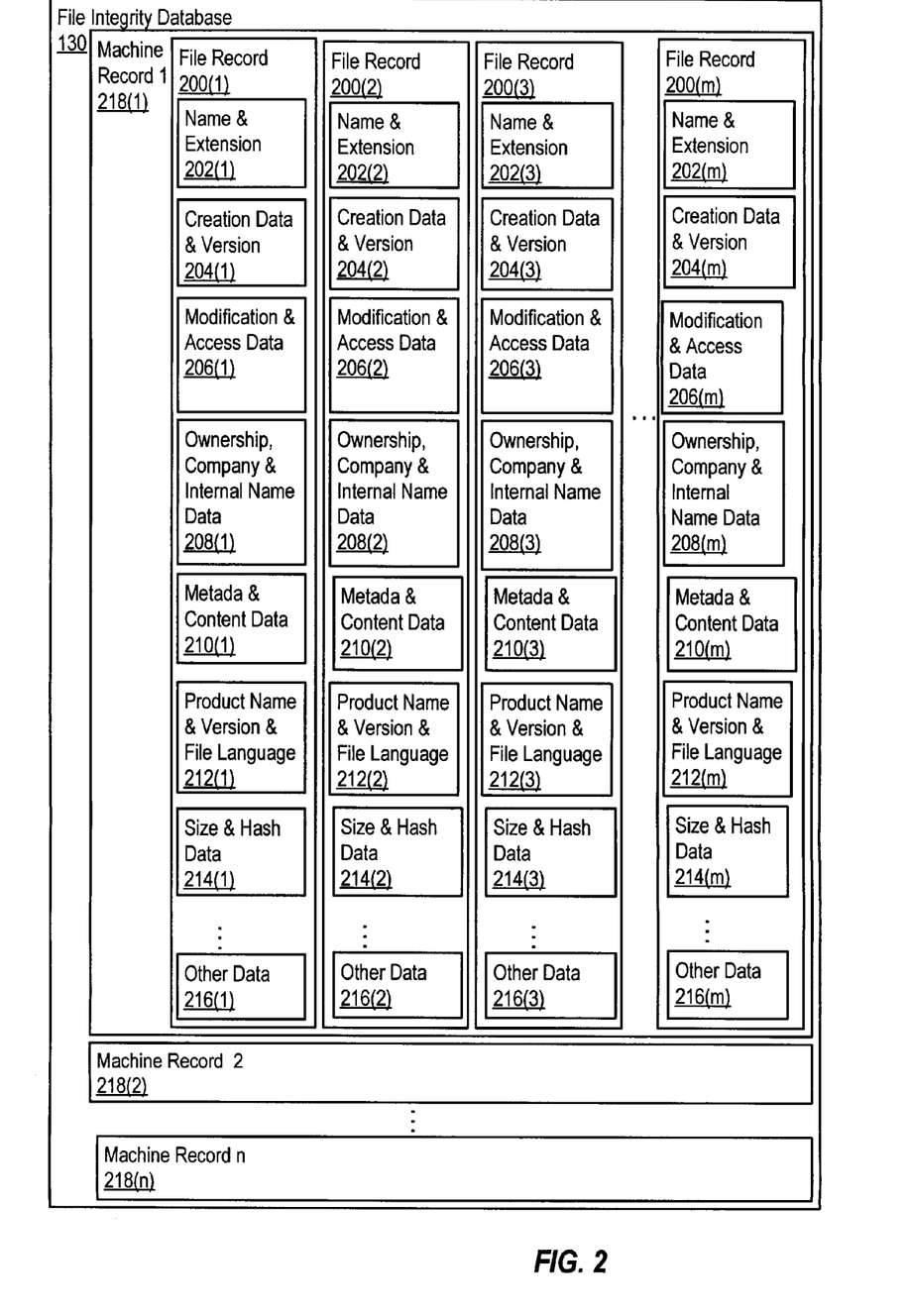
FIG. 2 depicts a block diagram of a file integrity database for performing automated remediation operations on corrupted or tampered files, according to one embodiment of the present invention.

Turning now to FIG. 2, a simplified block diagram of a file integrity database for performing automated remediation operations on corrupted or tampered files, according to one embodiment of the present invention, is illustrated. File integrity database 130 contains machine records 218(1)-218(n), each of which corresponds to an image, taken at a particular time, of a machine, multiple machines, or some part of a machine, such as one of clients 100a-100n, respectively. A single machine record among machine records 218(1)-218(n) may represent multiple machines, and likewise, a single machine may be represented by multiple machine records 218(1)-218(n).

In the illustrated embodiment, each of machine records 218(1)-218(n) contains a plurality of file records 200(1)-200(m). Each of file records 200(1)-200(m) is associated with at least one of files the files stored in files 126(1) or files 126(2). In the exemplary embodiment portrayed in FIG. 2, a plurality of characteristics is recorded for each of file records 200(1)-200(m), some of which are used as preliminary characteristics to determine correspondence between files on different clients 100a-100n, and some of which are used as secondary characteristics to detect tampering or corruption within a particular file from among files 126. Alternative embodiments of the present invention may use fewer, more or different characteristics as preliminary characteristics to determine correspondence between files on different clients 100a-100n or as secondary characteristics to detect tampering or corruption within a particular file from among files 126 without departing from the scope and intent of the present invention.

In the illustrated embodiment, each of file records 200(1)-200(m) contains a filename and extension 202(1)-202(m), which provides a descriptive identifier the corresponding files 126(1) or (2). As a non-limiting example of one embodiment of how this information can be used, file integrity survey engine 128 is configured, with a file integrity rule in file integrity rules data structure 134 to use matching filenames and extensions 202(1)-202(m) as a preliminary characteristic to indicate that the corresponding files with identical filenames may be copies of the same data.

In the illustrated embodiment, each of file records 200(1)-200(m) also contains file creation data 204(1)-204(m), which includes, by way of non-limiting example, the time and date of file creation, creating application, and creating user. As a non-limiting example of one embodiment, file integrity survey engine 128 is configured, with a file integrity rule in file integrity rules data structure 134 to use matching file creation data 204(1)-204(m) as a preliminary characteristic to indicate that multiple files 126 may be copies of the same data. Further, mismatched file creation data 204(1)-204(m) can be used in one embodiment as a secondary characteristic to indicate, by way of non-limiting example of one embodiment, that a corresponding file to the mismatched creation date requires replacement due to tampering or corruption.

In the illustrated embodiment, each of file records 200(1)-200(m) further contains file modification and access data 206(1)-206(m), which includes, by way of non-limiting example, the time and date of file modifications and accesses, modifying and accessing applications, and users modifying and accessing the corresponding file. As a non-limiting example of one embodiment, file integrity survey engine 128 is configured, with a file integrity rule in file integrity rules data structure 134 to use matching file modification and access data 206(1)-206(m) as a preliminary characteristic to indicate that multiple files 126 may be copies of the same data. Further, file modification and access data 206(1)-206(m) can be used in one embodiment as a secondary characteristic to indicate, that a corresponding file to the mismatched modification and access data requires replacement due to tampering or corruption.

In the illustrated embodiment, each of file records 200(1)-200(m) also contains file ownership, company and internal name data 208(1)-208(m), which includes, by way of non-limiting example, the identity of an owner, the company of an owner and the group of an owner of the corresponding file.

Content of file ownership data 208(1)-208(m) can, in one embodiment, be provided by file integrity survey engine 128. As a non-limiting example of one embodiment, file integrity survey engine 128 could be configured with a file integrity rule in file integrity rules data structure 134 to use common ownership of files on multiple clients 100a-100n as a preliminary characteristic to indicate that multiple files 126 may be copies of the same data. Further, file ownership, company and internal name data 208(1)-208(m) can be used in one embodiment as a secondary characteristic to indicate, by way of non-limiting example of one embodiment, that a corresponding file requires replacement due to tampering or corruption.

In the illustrated embodiment, each of file records 200(1)-200(m) also contains metadata and file content data 210(1)-210(m), which includes content and format indexing data provided by file integrity survey engine 128 that is used as a preliminary characteristic to indicate that multiple files 126 files on multiple clients 100a-100n may be copies of the same data. Further, metadata and file content data 210(1)-210(m) is used as a secondary characteristic to indicate, by way of non-limiting example of one embodiment, that a corresponding file requires replacement due to tampering or corruption.

In the illustrated embodiment, each of file records 200(1)-200(m) also contains product name, version and file language data 212(1)-212(m) provided by file integrity survey engine 128, which includes indicia of the product and version with which a file 126 is associated as well as the language of the file, which is used as a preliminary characteristic to indicate that multiple files 126 files on multiple clients 100a-100n may be copies of the same data. Further, product name, version and file language data 212(1)-212(m) is used as a secondary characteristic to indicate, by way of non-limiting example of one embodiment, that a corresponding file requires replacement due to tampering or corruption.

In the illustrated embodiment, each of file records 200(1)-200(m) also contains file size and hash data 214(1)-214(m) provided by file integrity survey engine 128, which includes a value of the size of a file 126, which can be used as a preliminary characteristic to indicate that multiple files 126 files on multiple clients 100a-100n may be copies of the same data. Further, a hash value from file size and hash data 214(1)-214(m) can be used as a secondary characteristic to indicate that a corresponding file requires replacement due to tampering or corruption. A hash function is any well-defined procedure or mathematical function for combining data into a relatively small integer, that may serve as an index into an array. The values returned by a hash function are called hash values, hash codes, hash sums, or simply hashes.

Additionally, each of file records 200(1)-200(m) may contain other data 216(1)-216(m) provided by file integrity survey engine 128, which will vary from embodiment to embodiment without departing from the scope of the present invention. Other data 216(1)-216(m) can be used as a secondary characteristic to indicate, by way of non-limiting example of one embodiment, that a corresponding file requires replacement due to tampering or corruption. Likewise, other data 216(1)-216(m) can be used as a preliminary characteristic to indicate, by way of non-limiting example of one embodiment, that multiple files 126 files on multiple clients 100a-100n may be copies of the same data.

Figure 3:
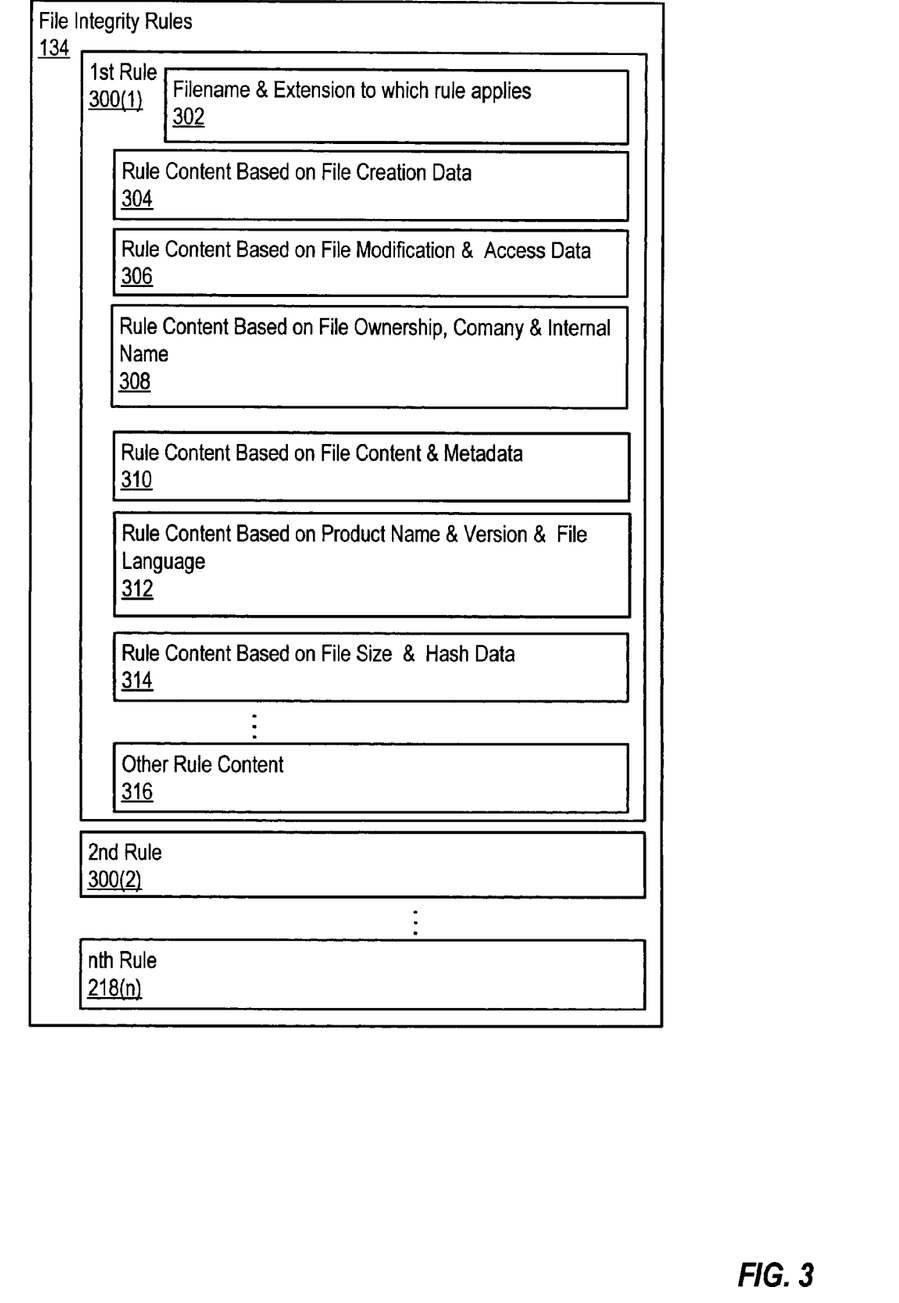
FIG. 3 illustrates a block diagram of a file integrity rules data structure for performing automated remediation operations on corrupted or tampered files, according to one embodiment of the present invention.

FIG. 3 illustrates a simplified block diagram of a file integrity rules data structure for performing automated remediation operations on corrupted or tampered files, according to one embodiment of the present invention. In one embodiment, file integrity rules data structure 134 contains rules 300(1)-300(n) generated from file integrity database 130 and backup preferences 144 by backup module 112. In an alternative embodiment, file integrity rules data structure 134 contains rules 300(1)-300(n) generated from file integrity database 130 by file integrity server 112. The rules in file integrity rules data structure 134 can be used by file integrity survey engine 128 to determine whether a file from among 126 should be replaced by restore module 132 or deployment server 102. As will, in light of the present disclosure, prove readily apparent to a person having ordinary skill in the relevant data processing or data storage arts, alternative embodiments of the present invention may use fewer, more or different rules 300(1)-300(n) based on fewer, more or different characteristics as secondary characteristics to detect tampering or corruption within a particular file from among files 126 without departing from the scope and intent of the present invention.

In one embodiment, each of rules 300(1)-300(n) of file integrity rules data structure 134 provides a rule individually dispositive of the question of whether a file from among 126 should be replaced by restore module 132 or deployment server 102, while alternative embodiments may provide for combinations of rules 300(1)-300(n) from file integrity rules data structure 134, such as a point value for a scoring system used by file integrity survey engine 128 to determine whether a file from among 126 should be replaced by restore module 132 or deployment server 102. Each of rules 300(1)-300(n) contains a filename and extension 302 to which rule from among rules 300(1)-300(n) applies.

Rule content based on file creation data 304 indicates the impact of content of file creation data 204(1)-204(n) of file records 200(1)-200(n) on whether a file from among files 126 should be replaced by restore module 132 or deployment server 102. Rule content based on file modification and access data 306 indicates the impact of content of file modification and access data 206(1)-206(n) on whether a file from among files 126 should be replaced by restore module 132 or deployment server 102. Similarly, rule content based on file ownership 308 indicates the impact of content of file ownership data 208(1)-208(n) on whether a file from among files 126 should be replaced by restore module 132 or deployment server 102.

Rule content based on file content and metadata 310 indicates the impact of content of file content and metadata 210(1)-210(n) on whether a file from among files 126 should be replaced by restore module 132 or deployment server 102. Likewise, rule content based on product name and version and file language 312 indicates the impact of product name and version and file language 212(1)-212(n) on whether a file from among files 126 should be replaced by restore module 132 or deployment server 102. Rule content based on file size and hash 314 indicates the impact of file size and hash data 214(1)-214(n) on whether a file from among files 126 should be replaced by restore module 132 or deployment server 102. Finally, other rule content 316, which will vary between embodiments of the present invention and be based on other data, indicate the impact of content of other data 216(1)-216(n) on whether a file from among files 126 should be replaced by restore module 132 or deployment server 102.

Figure 4A:
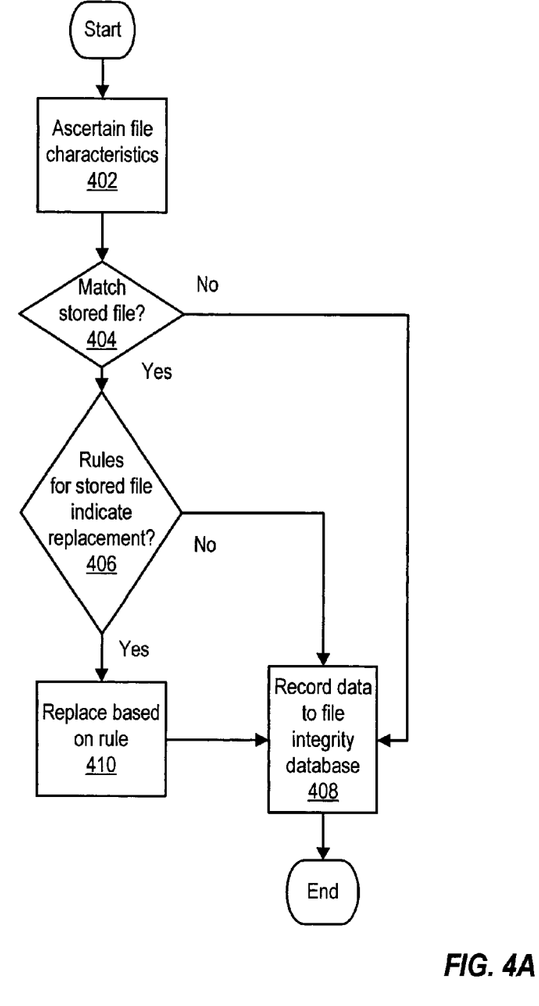
FIG. 4A is a flowchart of one embodiment of a method for performing automated remediation operations on corrupted or tampered files, according to one embodiment of the present invention.

FIG. 4A illustrates a simplified flow diagram of a method for performing automated remediation operations on corrupted or tampered files, according to one embodiment of the present invention. In one embodiment of the present invention, the illustrated steps are performed by file integrity survey engine 128. After the process starts, a set of characteristics are ascertained from among files 126(1) (402). Step 404 illustrates determining from preliminary characteristics whether a set of preliminary characteristics of a file from among files 126(1) matches a set of preliminary characteristics of a reference data structure, such as a file from among files 126(2). Such determining is performed using file integrity rules structure 134 as discussed above with respect to FIG. 2. If a determination is made that a set of preliminary characteristics of a file from among files 126(1) does not match any set of preliminary characteristics of a reference data structure, then data associated with the file is recorded in file integrity database 130 (e.g., characteristics of the file from among files 126(1) ascertained in step 402 as a file record 200$n$ representing a newly-discovered file) (408).

Returning to step 404, if a determination is made that the set of preliminary characteristics of the file from among files 126(1) matches a set of preliminary characteristics of the reference data structure, then a determination is made as to whether a secondary characteristic of a file from among files 126(1) indicates replacement of a file from among files 126 by restore module 132 or deployment server 102. Such determining is performed using file integrity data structure 134, as discussed above with respect to FIG. 2. If a determination is made that a secondary characteristic of the file indicates replacement of the file, restore module 132 or deployment server 102 replaces file 126 (410). Step 408 illustrates file integrity survey engine 128 recording data (herein including characteristics of the file from among files 126(1) ascertained in step 402 as a file record 200$n$ representing a replacement file) in file integrity database 130.

Returning to step 406, if file integrity survey engine 128 determines that no secondary characteristic of a file from among files 126(1) indicates replacement of a file from among files 126 by restore module 132 or deployment server 102, the process then proceeds to step 408, which depicts file integrity survey engine 128 recording data in file integrity database 130.

Figure 4B:
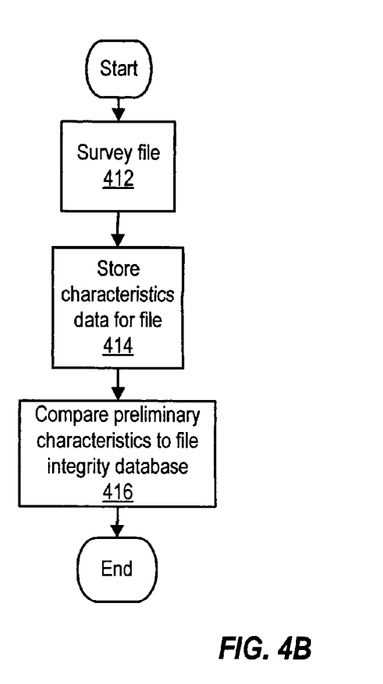
FIG. 4B is a flowchart of one embodiment of a method for ascertaining preliminary file characteristics in association with performing automated remediation operations on corrupted or tampered files, according to one embodiment of the present invention.

Referring now to FIG. 4B a flowchart of one embodiment of a method for ascertaining preliminary file characteristics in association with performing automated remediation operations on corrupted or tampered files, according to one embodiment of the present invention, is depicted. In one embodiment of the present invention, the illustrated process can be performed by file integrity survey engine 128. After starting, file characteristics of a file among files 126(1) are surveyed (412). The file characteristics of the file are stored (414) (e.g., in file integrity database 130). A set of preliminary characteristics of the file are compared to file records 200(1)-200($n$) of machine records 218(1)-218($n$) of file integrity database 130 (416).

Figure 5:
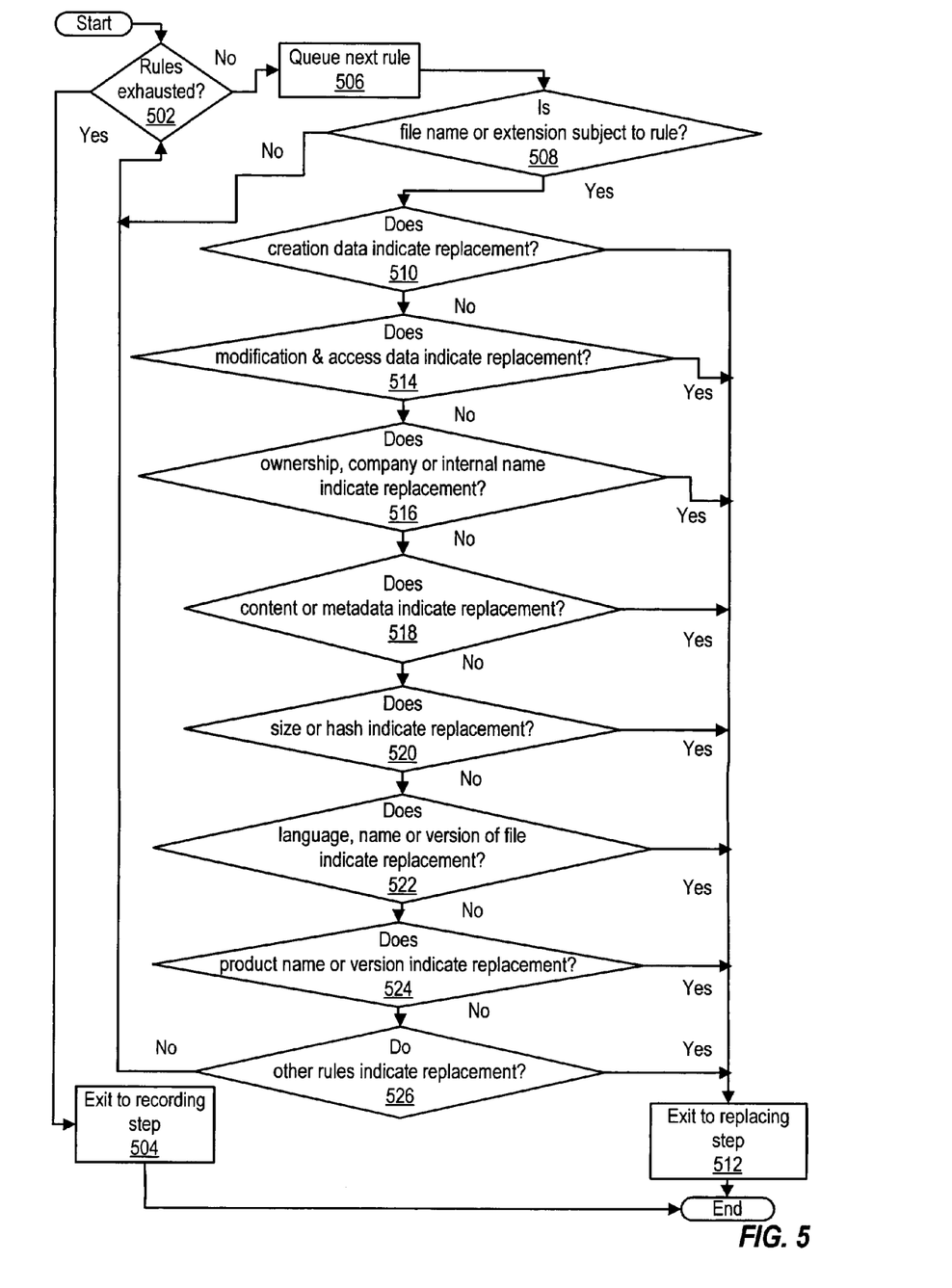
FIG. 5 is a flowchart of one embodiment of a method for determining that secondary characteristics of a data structure require replacement of a data structure as part of remediation operations on corrupted or tampered files, according to one embodiment of the present invention.

Turning now to FIG. 5 a flowchart of a method for determining that secondary characteristics of a file require replacement of a file as part of remediation operations on corrupted or tampered files, according to one embodiment of the present invention, is illustrated. The process of FIG. 5 represents one embodiment of step 406 of FIG. 4A. In one embodiment of the present invention, the illustrated process can be performed by file integrity survey engine 128. After the process starts, the process proceeds to step 502, which depicts determining whether available rules 300(1)-300($n$) in file integrity rules data structure 134 have been exhausted for determining that secondary characteristics of a file require replacement of a file as part of remediation operations on corrupted or tampered files. If available rules 300(1)-300($n$) have been exhausted, then the process next moves to step 504. Step 504 illustrates file integrity survey engine 128 exiting the process of FIG. 5 to a recording step, such as step 408 of FIG. 4A.

Returning to step 502, if available rules 300(1)-300($n$) in file integrity rules data structure 134 have not been exhausted, then a next rule from among available rules 300(1)-300($n$) is queued for evaluation (e.g., does the rule indicate replacement of the file being examined?) (506). In step 508, a determination is made as to whether the filename and extension of the file among files 126(1) currently being examined indicate that the file is subject to the queued rule. If a determination is made that the file currently being examined is not subject to the rule queued in step 506, then the process returns to step 502, which is described above.

If the determination is made that the file is subject to the rule queued in step 506, then a determination is made as to whether creation data associated with the file among files 126(1) currently being examined by file integrity survey engine 128 indicates, under the rule queued in step 506, that replacement of the file 128 is necessary (510).

If so, then the process exits to a recording step, such as step 410 of FIG. 4A (512).

Returning to step 510, if the creation data does not indicate replacement, then a determination is made as to whether modification and access data associated with the file currently being examined indicates, under the rule queued in step 506, that replacement of the file among files 126(1) currently being examined is necessary (514). If the determination is positive, then the process proceeds to step 512, which is described above.

Returning to step 514, if the modification and access date do not indicate replacement, then a determination is made as to whether ownership, company or internal name data associated with the file among files 126(1) currently being examined by file integrity survey engine 128 indicates, under the rule queued in step 506, that replacement of the file currently being examined is necessary (516). If this determination is positive, then the process proceeds to step 512, which is described above.

Returning to step 516, if ownership, company or internal name data do not indicate replacement then a determination is made as to whether the content or metadata associated with the file indicates, under the rule queued in step 506, that replacement is necessary (518). If this determination is positive, then the process proceeds to step 512, which is described above.

Returning to step 518, if content or metadata associated with the file among files 126(1) do not indicate that replacement is necessary, then a determination is made as to whether size or hash data indicates, under the rule queued in step 506, that replacement of the file is necessary (520). If this determination is positive, then the process proceeds to step 512, which is described above.

Returning to step 520, if size or hash data associated with the file does not indicate, under the rule queued in step 506, that replacement is necessary, a determination is made as to whether language, name or version data associated with the file indicates, under the rule queued in step 506, that replacement of the file is necessary (522). If this determination is positive, then the process proceeds to step 512, which is described above.

Returning to step 522, if language, name or version data associated with the file does not indicate, under the rule queued in step 506, that replacement of the file is necessary, then a determination is made as to whether product name or version data associated with the file indicates, under the rule queued in step 506, that replacement of the file is necessary. If the determination is positive, then the process proceeds to step 512, which is described above.

Returning to step 524, if file integrity survey engine 128 determines that product name or version data associated with the file does not indicate, under the rule queued in step 506, that replacement of the file is necessary, then a determination is made as to whether other data associated indicates, under the rule queued in step 506, that replacement of the file is necessary. If the determination is positive, then the process proceeds to step 512, which is described above.

Returning to step 524, if file integrity survey engine 128 determines that other data associated with the file currently being examined by file integrity survey engine 128 does not indicate, under the rule queued in step 506, that replacement of the is necessary, then the process returns to step 502, which is described above.

Figure 6:
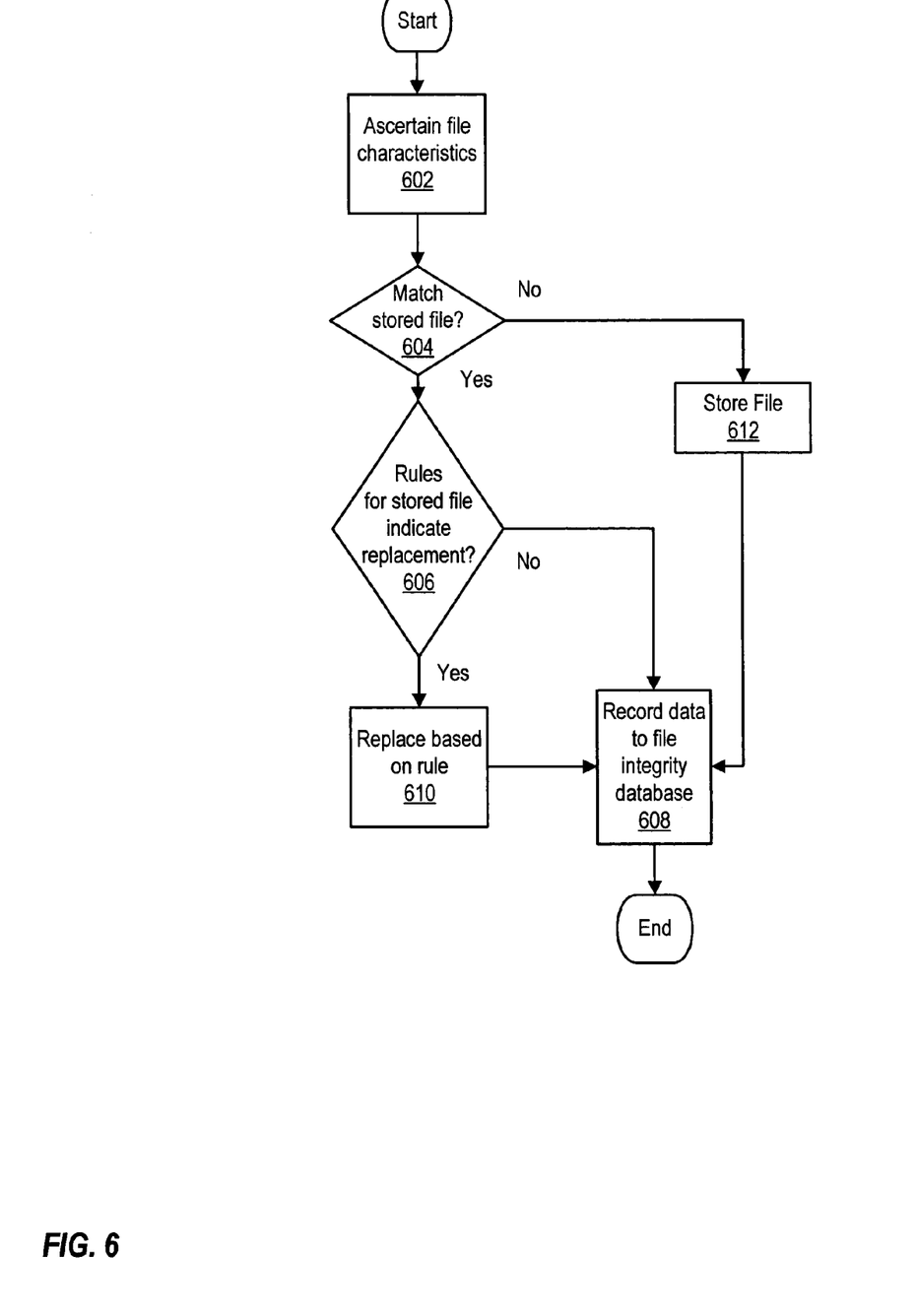
FIG. 6 is a flowchart of one embodiment of a method for performing automated remediation operations on corrupted or tampered files in the context of a backup operation, according to one embodiment of the present invention.

Referring now to FIG. 6 a flowchart of performing automated remediation operations on corrupted or tampered files in the context of a backup operation, according to one embodiment of the present invention, is depicted. In one embodiment of the present invention, the process of FIG. 6 is available. After the process starts, the process then proceeds to step 602, which depicts ascertaining a set of characteristics of a file from among files 126(1). A determination is made, using file integrity rules data structure 134, from preliminary characteristics (e.g., FIG. 2), as to whether a set of preliminary characteristics of the file matches a set of preliminary characteristics of a reference data structure, such as a file from among files 126(2) (604). If there is no match, then the process then proceeds to step 612, which depicts storing as a backup among files 126(2) the file. The process then proceeds to step 608, which depicts recording data (including characteristics of the file from among files 126(1) ascertained in step 602 as a file record 200n representing a newly-discovered file included in a backup among files 126(2)) in file integrity database 130(1).

Returning to step 604, if the determination is made that, a set of preliminary characteristics of the file matches a set of preliminary characteristics of a reference data structure, then the process next moves to step 606. Step 606 provides a determination, using file integrity rules data structure 134(1), from secondary characteristics, as indicated above with respect to FIG. 2 and further illustrated in FIG. 5, whether a secondary characteristic of a file from among files 126(1) indicates replacement of a file from among files 126 by restore module 132(1) or deployment server 102. If the determination in step 606 indicates replacement of the file, the process then proceeds to step 610, which provides replacement of the file. Such replacement can be performed, for example, by restore module 132 or deployment server 102. The process then proceeds to step 608, which is discussed above.

Returning to step 606, if the determination is made that no secondary characteristic of the file indicates replacement of the file, the process then proceeds to step 608, which is described above.

Figure 7:
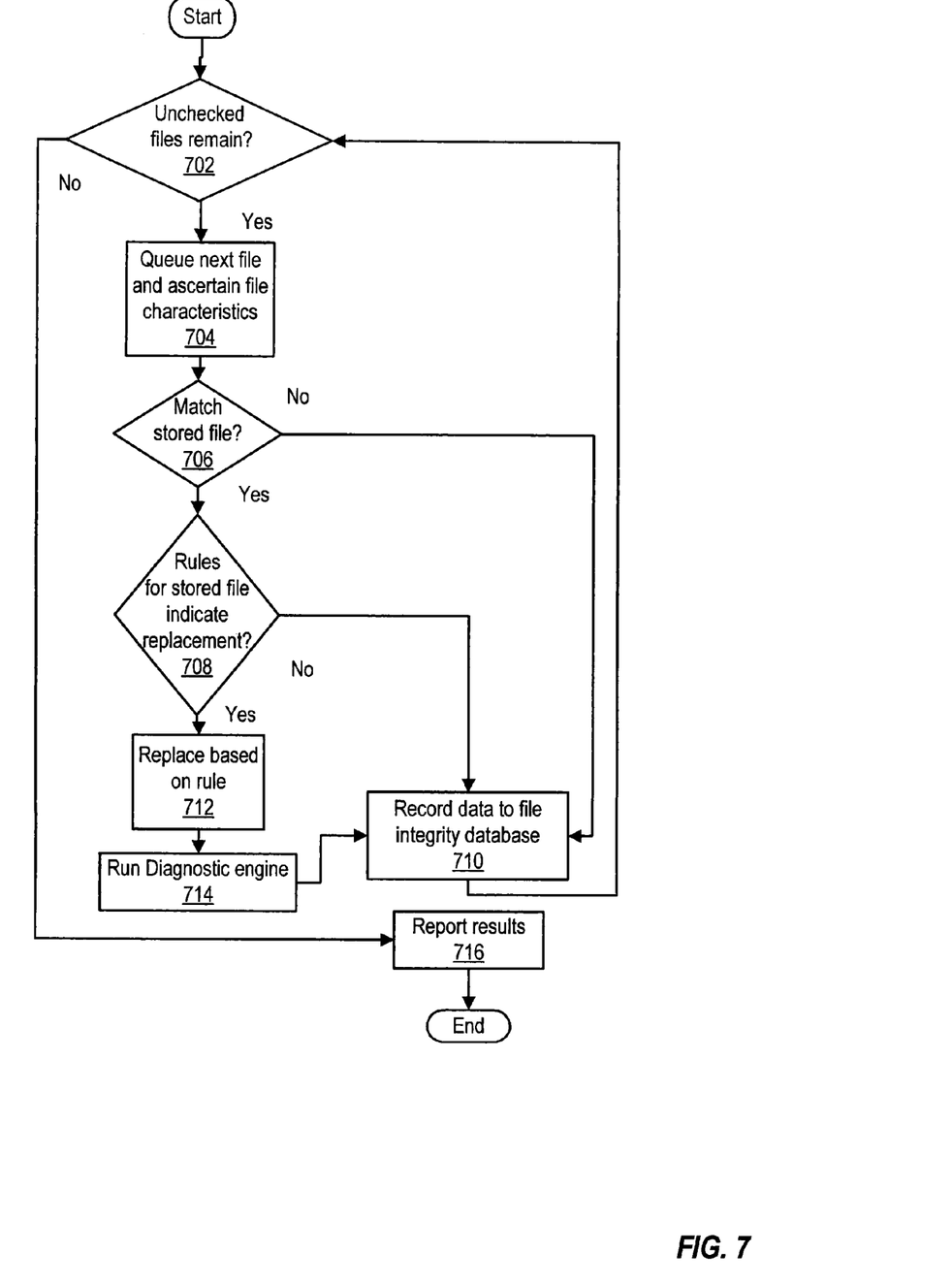
FIG. 7 is a flowchart of one embodiment of a method for performing automated remediation operations on corrupted or tampered files in the context of a diagnostic maintenance operation, according to one embodiment of the present invention.

Turning now to FIG. 7 a flowchart of a method for performing automated remediation operations on corrupted or tampered files in the context of a diagnostic maintenance operation, according to one embodiment of the present invention, is illustrated. In one embodiment of the present invention, the process of FIG. 7 is executed on file integrity server 142. After the process starts, the process then proceeds to step 702. Step 702 illustrates determining whether unchecked files remain among files 126(1). The process next moves to step 704, which depicts ascertaining a set of characteristics of a previously unchecked file from among files 126(1).

The process next moves to step 706. Step 706 illustrates determining, using file integrity rules data structure 134(2) whether a set of preliminary characteristics of a file from among files 126(1) matches a set of preliminary characteristics of a reference data structure, such as characteristics as surveyed from clients 100b-100n and recorded in file integrity database 130(2). Such determining can be performed using, for example, information stored in file integrity rules data structure 134(2), as discussed above with respect to FIG. 2. If the determination is that a set of preliminary characteristics of the file does not match any set of preliminary characteristics of the reference data structure, then the process then proceeds to step 710, which depicts recording data (including characteristics of the file ascertained in step 704 as a file record 200n representing a newly-discovered file) in file integrity database 130. The process then returns to step 702, which is described above.

Returning to step 706, if the determination is made that a set of preliminary characteristics of the file matches a set of preliminary characteristics of a reference data structure, then the process next moves to step 708. Step 708 provides for determining, using file integrity rules data structure 134, from secondary characteristics, as indicated above with respect to FIG. 2 and further illustrated in FIG. 5, whether a secondary characteristic of the file indicates replacement of the file. Restore module 132(2) is capable of drawing a replacement copy from clients 100b-100n or deployment server 102 to replace the file. If replacement is indicated, the process then proceeds to step 712, which depicts replacing the file. The process then proceeds to run a diagnostic engine (e.g., 136(2)) to ascertain a cause of corruption or remediation requiring the replacement executed in step 712 (714). The process next moves to step 710, which is discussed above.

Returning to step 708, if the determination is made that no secondary characteristic of the file from indicates replacement of the file, the process then proceeds to step 710, which depicts recording data in file integrity database 130.

Figure 8:
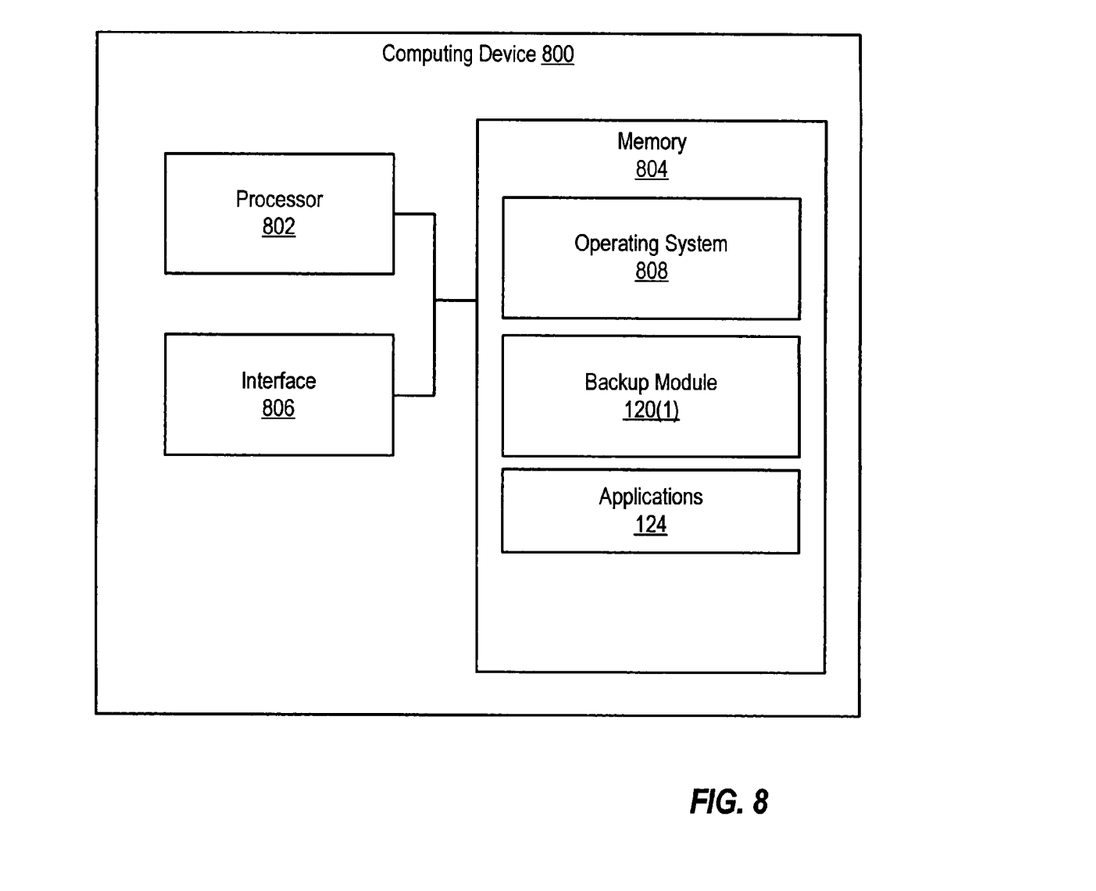
FIG. 8 depicts a block diagram of a computer system configured for performing automated remediation operations on corrupted or tampered files, according to one embodiment of the present invention.

Referring now to FIG. 8 a block diagram of a computer system configured for performing automated remediation operations on corrupted or tampered files, according to one embodiment of the present invention, is depicted. FIG. 8 is a block diagram of a computing device 800 that implements a backup module 120(1) (e.g., one of backup modules 120(1)-120(3) of FIG. 1) that can participate in backups and restores including selective backup operations based on file history data, according to one embodiment of the present invention. Computing device 800 can implement client 100a or media server 100(3) of FIG. 1. One skilled in the art will, in light of this disclosure, quickly ascertain that computing device 800 may also, with modifications, implement file integrity server 142 or deployment server 102.

As illustrated, computing device 800 includes one or more processors 802 (e.g., microprocessors, PLDs (Programmable Logic Devices), or ASICs (Application Specific Integrated Circuits)) configured to execute program instructions stored on or in a computer-readable medium such as memory 804. Memory 804 can include various types of RAM (Random Access Memory), ROM (Read Only Memory), Flash memory, MEMS (Micro Electro-Mechanical Systems) memory, and the like. Computing device 800 also includes one or more interfaces 806. Processor 802, memory 804, and interface 806 are coupled to send and receive data and control signals by a bus or other interconnect.

Interface(s) 806 can include an interface to a storage device on which information to be backed up or restored is stored. Interface(s) 806 can also include an interface to a network (e.g., network 108 or Internet 110 of FIG. 1) for use in communicating with a server.

The program instructions and data implementing backup module 120(1), applications 124 and operating system 808 can be stored on various computer readable storage media such as memory 804. In some embodiments, such software is stored on a computer readable storage medium such as a CD (Compact Disc), DVD (Digital Versatile Disc), hard disk, optical disk, tape device, floppy disk, and the like). In order be executed by processor 802, the instructions and data implementing backup module 120(1) are loaded into memory 804 from the other computer readable medium. The instructions and/or data can also be transferred to computing device 800 for storage in memory 804 via a network such as the Internet or upon a carrier medium. In some embodiments, a computer readable medium is a carrier medium such as a network and/or a wireless link upon which signals such as electrical, electromagnetic, or digital signals, on which the data and instructions implementing backup module 120 are encoded, are conveyed.

Although the present invention has been described in connection with several embodiments, the invention is not intended to be limited to the specific forms set forth herein. On the contrary, it is intended to cover such alternatives, modifications, and equivalents as is reasonably included within the scope of the invention as defined by the appended claims.

What is claimed is:

1. A method comprising:
    ascertaining a set of preliminary characteristics of a first data structure, wherein
        said ascertaining said set of preliminary characteristics of said first data structure comprises
            surveying said first data structure for said set of preliminary characteristics, and
            storing said set of preliminary characteristics in a file integrity database;
    responsive to determining that said set of preliminary characteristics matches a set of characteristics of a reference data structure, determining whether said first data structure is corrupt and should be replaced with said reference data structure, wherein
        said reference data structure is a copy of said first data structure,
        said determining whether said first data structure is corrupt and should be replaced with said reference data structure is performed by a computing device,
        said determining whether said first data structure is corrupt and should be replaced with said reference data structure comprises determining whether a rule from a set of rules indicates replacement of said first data structure based on a set of secondary characteristics of said first data structure,
        each rule from said set of rules identifies whether said first data structure is corrupt, and
        said set of secondary characteristics of said first data structure comprises characteristics that identify said first data structure and describe content and/or a format of said first data structure; and
    responsive to determining that said first data structure is corrupt and should be replaced with said reference data structure, replacing said first data structure with said reference data structure.

2. The method of claim 1, further comprising, responsive to determining that said set of preliminary characteristics does not match said set of characteristics of said reference data structure:
    storing said first data structure in a backup medium; and
    recording said set of preliminary characteristics to said file integrity database.

3. The method of claim 1, further comprising, responsive to determining that said first data structure is corrupt and should be replaced with said reference data structure:
    running a diagnostic engine; and
    recording a result of said diagnostic engine to said file integrity database.

4. The method of claim 1, further comprising:
    recording said set of preliminary characteristics and a replacement indication to said file integrity database.

5. The method of claim 1, further comprising:
    comparing said set of preliminary characteristics of said first data structure to said set of characteristics of said reference data structure, wherein
        said set of characteristics of said reference data structure is stored in a file record,
        said file record is selected from a plurality of file records within a machine record, and
        said machine record is selected from a plurality of machine records in said file integrity database.

6. The method of claim 1, wherein said determining whether said first data structure is corrupt and should be replaced with said reference data structure further comprises:
    determining whether an item of creation data indicates that said first data structure should be replaced with said reference data structure;
    determining whether an item of modification data indicates that said first data structure should be replaced with said reference data structure;
    determining whether an item of access data indicates that said first data structure should be replaced with said reference data structure;
    determining whether an item of ownership data indicates that said first data structure should be replaced with said reference data structure;
    determining whether an internal name indicates that said first data structure should be replaced with said reference data structure;
    determining whether a company name indicates that said first data structure should be replaced with said reference data structure;
    determining whether an item of content data indicates that said first data structure should be replaced with said reference data structure;
    determining whether an item of metadata indicates that said first data structure should be replaced with said reference data structure;
    determining whether a size of said data structure indicates that said first data structure should be replaced with said reference data structure;
    determining whether a hash of said data structure indicates that said first data structure should be replaced with said reference data structure;
    determining whether a language of said data structure indicates that said first data structure should be replaced with said reference data structure;
    determining whether a name of said data structure indicates that said first data structure should be replaced with said reference data structure;
    determining whether a version of said data structure indicates that said first data structure should be replaced with said reference data structure;
    determining whether a product name indicates that said first data structure should be replaced with said reference data structure; and
    determining whether a product version indicates that said first data structure should be replaced with said reference data structure.

7. A system comprising:
    one or more processors; and
    memory coupled to said one or more processors, wherein the memory stores program instructions executable by said one or more processors to:

ascertain a set of preliminary characteristics of a first data structure, wherein
said program instructions that are executable to ascertain said set of preliminary characteristics of said first data structure are further executable to
survey said first data structure for said set of preliminary characteristics, and
store said set of preliminary characteristics in a file integrity database,
determine whether said first data structure is corrupt and should be replaced with a reference data structure, in response to a determination that said set of preliminary characteristics matches a set of characteristics of said reference data structure, wherein
said reference data structure is a copy of said first data structure,
said determination as to whether said first data structure is corrupt and should be replaced with said reference data structure determines whether a rule from a set of rules indicates replacement of said first data structure based on a set of secondary characteristics of said first data structure,
each rule from said set of rules is used to identify whether said first data structure is corrupt, and
said set of secondary characteristics of said first data structure comprises characteristics that identify said first data structure and describe content and/or a format of said first data structure, and
replace said first data structure with said reference data structure, in response to a determination that said first data structure is corrupt and should be replaced with said reference data structure.

8. The system of claim 7, wherein the program instructions are further executable to:
store said first data structure in a backup medium, in response to a determination that said set of preliminary characteristics does not match said set of characteristics of said reference data structure, and
record said set of preliminary characteristics to said file integrity database, in response to said determination that said set of preliminary characteristics does not match said set of characteristics of said reference data structure.

9. The system of claim 7, wherein the program instructions are further executable to:
run a diagnostic engine, and
record a result of said diagnostic engine to said file integrity database.

10. The system of claim 7, wherein the program instructions are further executable to:
record said set of preliminary characteristics and a replacement indication to said file integrity database.

11. The system of claim 7, wherein the program instructions are further executable to:
compare said set of preliminary characteristics of said first data structure to said set of characteristics of said reference data structure, wherein
said set of characteristics of said reference data structure is stored in a file record,
said file record is selected from a plurality of file records within a machine record, and
said machine record is selected from a plurality of machine records in said file integrity database.

12. The system of claim 7, wherein the instructions are further configured to:
determine whether an item of creation data indicates that said first data structure should be replaced with said reference data structure,
determine whether an item of modification data indicates that said first data structure should be replaced with said reference data structure,
determine whether an item of access data indicates that said first data structure should be replaced with said reference data structure,
determine whether an item of ownership data indicates that said first data structure should be replaced with said reference data structure,
determine whether an internal name indicates that said first data structure should be replaced with said reference data structure,
determine whether a company name indicates that said first data structure should be replaced with said reference data structure,
determine whether an item of content data indicates that said first data structure should be replaced with said reference data structure,
determine whether an item of metadata indicates that said first data structure should be replaced with said reference data structure,
determine whether a size of said data structure indicates that said first data structure should be replaced with said reference data structure,
determine whether a hash of said data structure indicates that said first data structure should be replaced with said reference data structure,
determine whether a language of said data structure indicates that said first data structure should be replaced with said reference data structure,
determine whether a name of said data structure indicates that said first data structure should be replaced with said reference data structure,
determine whether a version of said data structure indicates that said first data structure should be replaced with said reference data structure,
determine whether a product name indicates that said first data structure should be replaced with said reference data structure, and
determine whether a product version indicates that said first data structure should be replaced with said reference data structure.

13. A non-transitory computer-readable storage medium, comprising:
a first set of instructions, executable by a processor, configured to ascertain a set of preliminary characteristics of a first data structure, wherein
said first set of instructions that are configured to ascertain said set of preliminary characteristics of said first data structure further comprise
a first subset of instructions, executable by said processor, configured to survey said first data structure for said set of preliminary characteristics, and
a second subset of instructions, executable by said processor, configured to store said set of preliminary characteristics in a file integrity database;
a second set of instructions, executable by said processor, configured to determine whether said first data structure is corrupt and should be replaced with a reference data structure, in response to a determination that said set of preliminary characteristics matches a set of characteristics of said reference data structure, wherein
said reference data structure is a copy of said first data structure, said determination as to whether said first data structure is corrupt and should be replaced with said reference data structure determines whether a rule from a set of rules indicates replacement of said first data structure based on a set of secondary characteristics of said first data structure, each rule from said set of rules is used to identify whether said first data structure is corrupt, and said set of secondary characteristics of said first data structure comprises characteristics that identify said first data structure and describe content and/or a format of said first data structure; and a third set of instructions, executable by said processor, configured to replace said first data structure with said reference data structure in response to determining that said first data structure is corrupt and should be replaced with said reference data structure.

14. The non-transitory computer-readable storage medium of claim 13, further comprising:

a fourth set of instructions, executable by said processor, configured to:

store said first data structure in a backup medium, in response to a determination that said set of preliminary characteristics does not match said set of characteristics of said reference data structure, and record said set of preliminary characteristics to said file integrity database, in response to said determination that said set of preliminary characteristics does not match said set of characteristics of said reference data structure.

15. The non-transitory computer-readable storage medium of claim 13, further comprising:

a fourth set of instructions, executable by said processor, configured to:

run a diagnostic engine, in response to a determination that said first data structure is corrupt and should be replaced with said reference data structure, and record a result of said diagnostic engine to said file integrity database, in response to said determination that said first data structure should be replaced with said reference data structure.

16. The non-transitory computer-readable storage medium of claim 13, further comprising:

a fourth set of instructions, executable by said processor, configured to record said set of preliminary characteristics and a replacement indication to said file integrity database.

17. The non-transitory computer-readable storage medium of claim 13, further comprising:

a fourth set of instructions, executable by said processor, configured to compare said set of preliminary characteristics of said first data structure to said set of characteristics of said reference data structure, wherein said set of characteristics of said reference data structure are stored in a file record, said file record is selected from a plurality of file records within a machine record, and said machine record is selected from a plurality of machine records in said file integrity database.

\* \* \* \* \*